United States Patent

[11] 3,583,405

| [72] | Inventors | Ralph August Gerhardt<br>Andover;<br>Duane Herbert Ziegler, Moline, both of, Ill. |
|---|---|---|
| [21] | Appl. No. | 820,217 |
| [22] | Filed | Apr. 29, 1969 |
| [45] | Patented | June 8, 1971 |
| [73] | Assignee | Deere & Company<br>Moline, Ill. |

[54] HARVESTER SHAFT SPEED MONITORING SYSTEM
9 Claims, 3 Drawing Figs.

[52] U.S. Cl. .................................................. 130/27R, 340/271
[51] Int. Cl. ...................................................... A01f 12/18
[50] Field of Search .......................................... 130/27; 340/267, 271

[56] References Cited

UNITED STATES PATENTS

| 2,262,453 | 11/1941 | Dray ............................ | 130/27 |
| 3,368,214 | 2/1968 | Swanson ....................... | 340/271 |

*Primary Examiner*—Antonio F. Guida
*Attorneys*—H. Vincent Harsha, Harold M. Knoth, William A. Murray and John M. Nolan ABSTRACT: A self-propelled combine has separate drive shafts for its separator conveyor, clean grain elevator, strawwalkers, tailings conveyors, and straw chopper, and each of said drive shafts has a magnetic pickup device which generates an electrical pulse with each revolution of the shaft. The output of the magnetic pickup devices provides the input to an electronic circuit, which lights any one or more of a bank of five indicator lights corresponding to the particular shafts whenever the number of pulses generated by a particular magnetic pickup device falls below a predetermined rate as a result of a shaft speed falling below a predetermined level. The electronic circuit also causes the vehicle horn to sound when the speed of any of said shafts falls below its critical level.

PATENTED JUN 8 1971

INVENTORS
R. A. GERHARDT &
D. H. ZIEGLER

BY John M Nolan

ATTORNEY

INVENTORS
R. A. GERHARDT &
D. H. ZIEGLER

ATTORNEY

HARVESTER SHAFT SPEED MONITORING SYSTEM

BACKGROUND OF THE INVENTION

This invention relates to a system for monitoring the speed of various driven components on an agricultural harvesting machine or the like.

With the advent of larger, more complex, higher speed harvesting machines, an increasing burden has been placed on the operator to adequately control the various adjustable components, steer the machine, and monitor the condition of various driven components. Also, the location of some of the driven components render them impossible to visually monitor from the harvester operator's station. Generally, in harvesting machine such as combines or the like, the various components are driven from the engine, in the case of a self-propelled harvester, or from the PTO input, in the case of a tractor-drawn PTO-operated harvester, through a system of belt drives. Belt slippage in the various drives can easily occur as a result of improper belt tension, an overload in the driven component, or similar reasons, causing the speed of the component to fall below a point necessary for adequate functioning of the component. Since the operator can generally see neither the improperly functioning component nor its associated drive, he is unaware of the malfunction in the machine.

To overcome this problem, various means have been proposed to permit the operator to monitor the speed and condition of various components during operation of the machine. For example, it is known to provide various types of pressure trips to actuate a signal when a buildup of material at a particular location in the harvester actuates the trip. It is also known to provide switches which are actuated when the drive shaft stops rotating or alternately to provide switches in association with slip clutches to actuate an indicator when the clutch slips. It is further known to drive electric generators through frictional contact with the various drive shafts on a combine, to actuate a signal when the generated voltage drops below a certain point as a result of a predetermined decrease in shaft speed.

SUMMARY OF THE INVENTION

According to the present invention, an improved system as provided to monitor the speed of various shafts in an agricultural harvesting machine. More specifically, magnetic means are provided on each of the monitored shafts to provide the inputs for an electronic monitoring system, so that no mechanical connection is required between the monitoring system and the monitored shafts.

Other features of the invention reside in the provision of both indicating lights and an audible signal when a particular shafts falls below its critical speed, and further to provide separate indicating lights for each shaft so that the operator is able to identify the malfunctioning drive.

Another feature resides in the provision of means for disconnecting the audible signal while the malfunctioning drive is below speed, and further to provide reset means to retest the speed of the shaft. Still other features of the invention reside in the provision of means for disconnecting the shaft-monitoring system when the driving force to the various components is disconnected and further in the provision of a time delay circuit to allow sufficient time for the various drive shafts to come up to speed after the main clutch is engaged, so that the visible and audible indicators are not actuated before the drive shafts are able to reach their normal speeds.

DESCRIPTION OF THE PREFERRED EMBODIMENT

Figure 1:
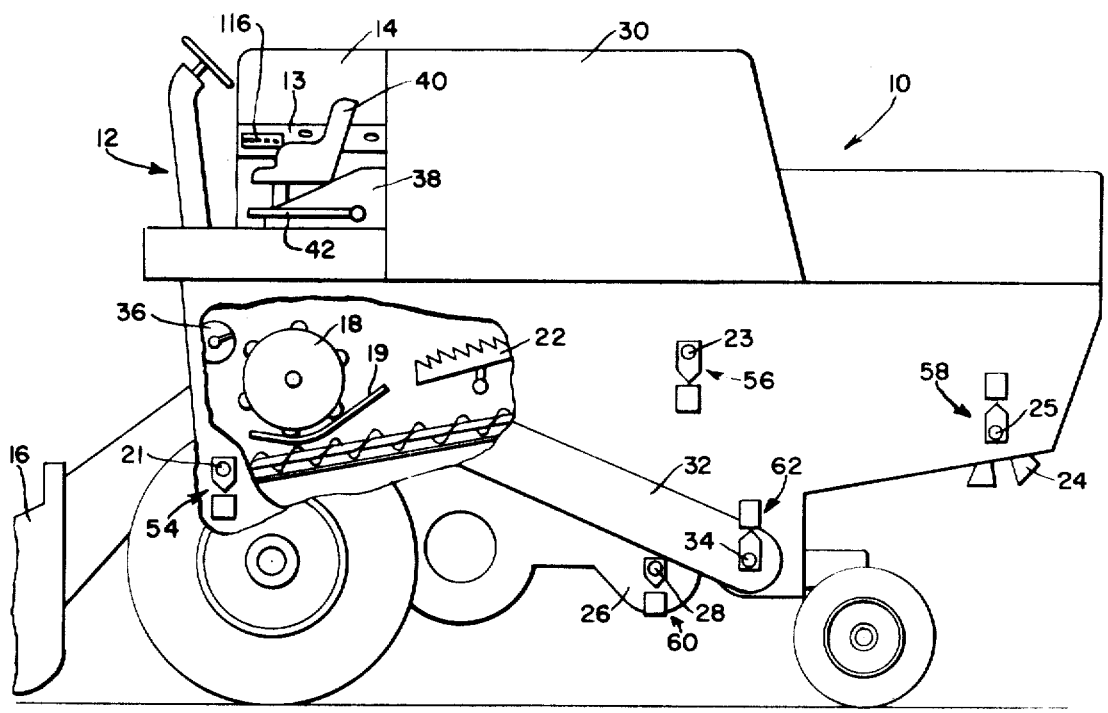
FIG. 1 is a somewhat schematic side elevation view of a self-propelled combine embodying the invention, with portions of the combine removed to show some of the driven components, and with the magnetic pickup devices on the various shafts schematically illustrated.

The shaft speed monitoring system is embodied in a self-propelled combine, which is illustrated in FIG. 1. The combine includes a main separator body, indicated generally by the numeral 10, having a forward elevated operator's station 12, which includes a control console 13 along its right-hand side. Laterally adjacent to the control console 13 is an engine enclosure 14, enclosing a conventional internal-combustion engine (not shown), which supplies power for the various driven components as well as for propelling the combine.

As the combine advances over a field, the crop is removed from the field by a forwardly disposed header or harvesting platform 16, only the rearward portion of which is shown in FIG. 1. The header 16 delivers the crop rearwardly to an axially transverse threshing cylinder 18 having an associated concave 19 within the separator body 10. Most of the grain is separated from the crop residue by the threshing cylinder and concave and falls through the concave onto a separator conveyor 20, which moves the grain rearwardly within the combine body. The separator conveyor 20 in the illustrated embodiment comprises a plurality of fore-and-aft auger-type conveyors disposed side by side underneath the threshing cylinder 18 and spanning the width of the combine body. The augers are driven through conventional bevel gearing at the forward end of the augers by a transverse drive shaft 21, which is somewhat schematically illustrated in FIG. 1.

The crop residue and unseparated grain are propelled upwardly and rearwardly by the threshing cylinder 18 onto a bank of conventional fore-and-aft extending strawwalkers 22, only the forward ends of which are shown in the drawings. The strawwalkers oscillate in a fore-and-aft direction and separate most of the remaining grain from the crop residue, the grain dropping onto the rearward end of the separator conveyor 20. The strawwalkers are mounted on conventional crank arms and are driven by a transverse drive shaft 23. The straw or crop residue moving over the rear end of the strawwalkers is discharged out the rear end of the combine body 10, although before it is deposited on the ground, it is generally further treated by a straw chopper 24, or alternately a straw spreader. The straw chopper 24 is schematically illustrated and is driven by a transverse drive shaft 25.

The separator conveyor 20 delivers the grain collected from the threshing cylinder 18 and the strawwalkers 22 to a grain-cleaning mechanism (not shown), which delivers the clean grain to a clean grain elevator 26, in the conventional manner. Only the outline of the lower housing portion of the clean grain elevator 26 is illustrated, since its detailed construction is immaterial. The elevator 26 is driven by a transverse drive shaft 28 and elevates the grain to a grain tank 30, mounted on the body 10 behind the operator's station 12. As is also conventional, the cleaning mechanism includes a tailings portion, which separates and collects incompletely threshed crop material. Such crop material is moved forwardly and upwardly alongside the combine body by a tailings elevator 32, only the outline of the rearward portion of the elevator housing being shown in the drawings. The tailings elevator is driven by a transverse auger 36 above and forwardly of the threshing cylinder, the auger 36 feeding the tailings to the threshing cylinder 18 for rethreshing.

The drive shafts 21, 23, 25, 28, and 34, like the other driven components in the combine, are driven by the combine engine through conventional drives. In the illustrated embodiment, the forward engine is transversely disposed, and has a transverse output shaft (not shown) disposed under a hood 38 on which an operator's seat 40 is mounted. The output shaft drives the various belt drives for the various driven components, and a clutch is typically associated with the belt drives on the output shaft to disengage the various belt drives. The clutch is manually actuated by the operator by a lever 42, which is schematically illustrated at the operator's station in FIG. 1.

Figure 3:
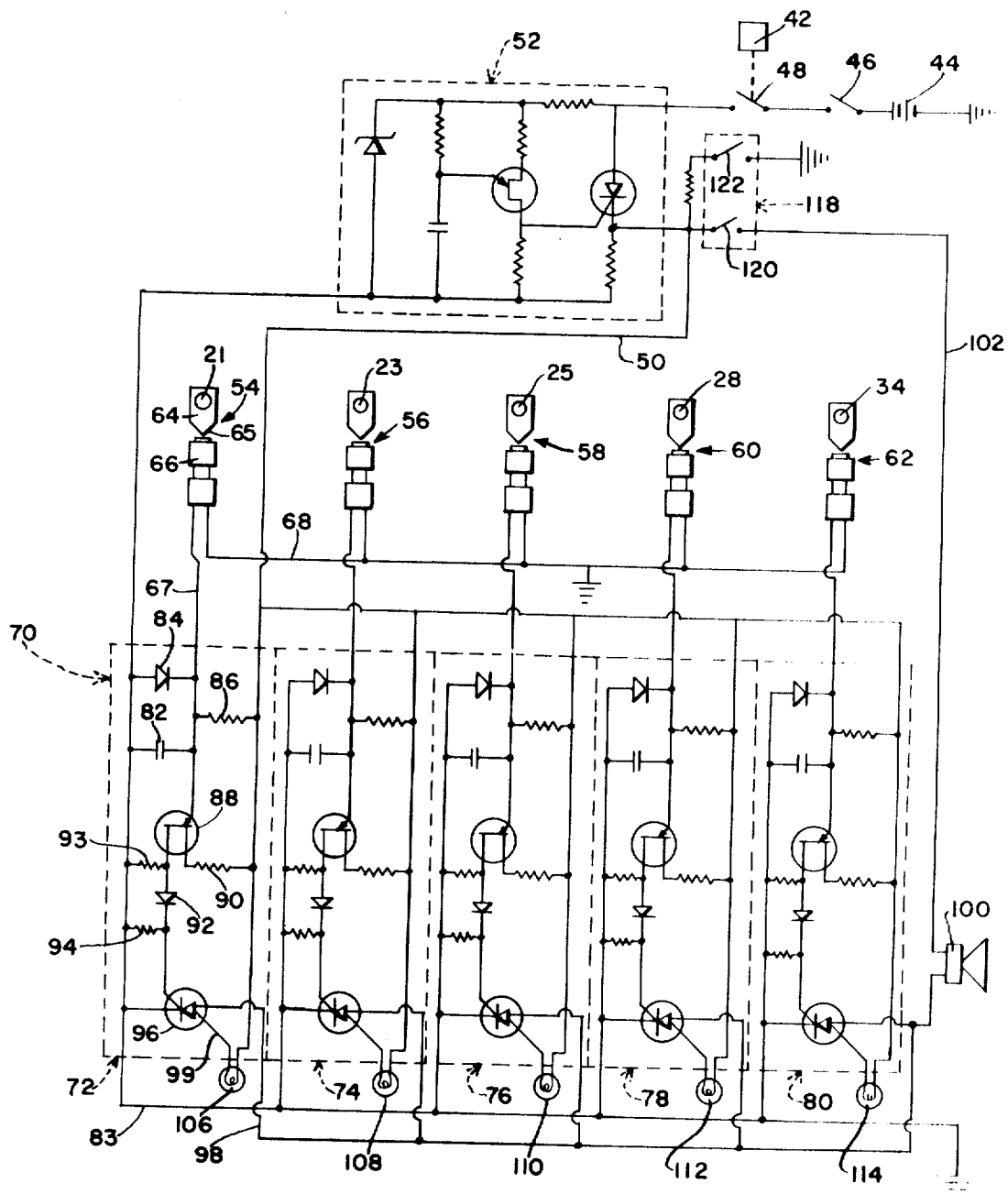
FIG. 3 is a schematic illustration of the shaft-monitoring system, including the details of the electronic circuitry involved.

The speeds of the separator conveyor drive shaft 21, the straw walker drive shaft 23, the straw chopper drive shaft 25, the clean grain elevator drive shaft 28, and the tailings elevator drive shaft 34 are monitored by an electronic monitoring system, which is schematically illustrated in FIG. 3. The monitoring system has a source of electric power 44, preferably the combine battery, which typically has a 12-volt output. The battery output is wired through an ignition switch 46 and a clutch switch 48, which is actuated by the clutch lever 42, so that the source of electric power 44 is disconnected from the monitoring system when the ignition switch is turned off or when the clutch, which connects the various component drives to the engine output, is disengaged. When the ignition switch is on and the component drive clutch is engaged, a voltage of 12 volts is supplied to a power lead 50 for the monitoring system through a time delay circuit 52. Since the time delay circuit is of conventional construction, it will not be described in detail, the time delay circuit merely providing a delay in the supply of electric power to the lead 50 after the switches 46 and 48 are closed. In the preferred embodiment, the time delay circuit 52 is arranged to provide approximately a 15-second delay between the closing of the switches 46 and 48 and the supply of electric power to the lead 50, which interval is sufficient for the various shafts to come up to operating speed after engagement of the clutch, thereby preventing the premature actuation of the monitoring system before the shafts have sufficient time to reach operating speed.

The inputs to the monitoring system are provided by identical magnetic pickup means 54, 56, 58, 60, and 62 respectively mounted on the drive shafts 21, 23, 25, 28, and 34. The magnetic pickup means are of conventional construction, and only the magnetic pickup means 54 will be described in detail. The pickup means 54, like the other pickup means, is schematically illustrated in the drawings and includes an actuator element 64, mounted on and rotatable with the drive shaft 21 and having a projecting point 65, which moves past an adjacent associated pulse pickup 66 to generate an electric pulse in an output lead 67 for each revolution of the shaft. Each pulse pickup unit 66 also has a ground lead 68, the ground leads of the respective pickup means being commonly connected.

The output leads of the five different magnetic pickup means 54, 56, 58, 60, and 62 provide the inputs for an electronic circuit, indicated generally by the numeral 70. The electronic circuit 70 has five different channels 72, 74, 76, 78, and 80, which are delineated by dotted lines in FIG. 3, the respective channels being associated with the respective magnetic pickup means 54, 56, 58, 60, and 62. As is apparent, except for slight differences in the values of the resistors and capacitors, each of the channels of the electronic circuit 70 is identical, and therefore only the channel 72, which is associated with the magnetic pickup means 54, will be described in detail. The power for each of the channels is supplied by the power lead 50.

The output lead 67 of the magnetic pickup means 54 provides the input for the channel 72 and is connected to one side of a capacitor 82, the other side of which is connected to a ground line 83. A one-way diode 84 is also connected across the input and the ground line, and a resistor 86 connects the input lead 67 to the power lead 50. The lead 67 also provides the input to a unit junction-type transistor 88, one lead of which is connected to the power lead 50 through a resistor 90 and the output lead of which is connected to a one-way diode 92, the opposite sides of which are connected to the ground line 83 through resistors 93 and 94. The output side of the diode 92 serves as the input to a silicone-controlled rectifier 96, which has one side connected to the ground line and the other side connected to leads 98 and 99. When the silicone-controlled rectifier 96 turns on, it connects the leads 98 and 99 to the ground to complete the circuit for an indicating system.

Figure 2:
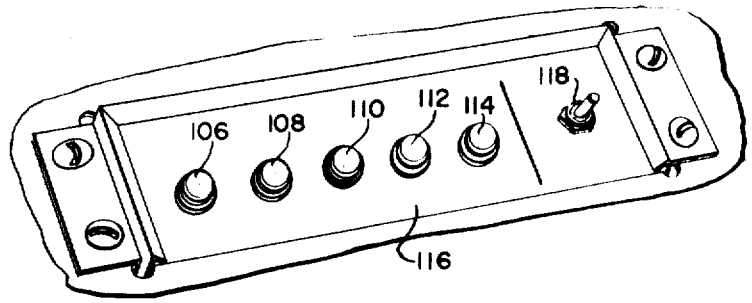
FIG. 2 is a perspective view of a portion of the control console at the operator's station of the combine, showing the various indicator lights and switches for the monitoring system.

The indicating system includes a horn 100, preferably the combine horn in the illustrated embodiment, which is connected to the power lead 50 through a powerline 102. The indicating system also includes indicator lights 106, 108, 110, 112, and 114 mounted in a panel 116, as best seen in FIG. 2. The panel 116 is mounted in the control console 13 at the operator's station in easy view of the operator. One side of the indicator light 106 is connected to the power lead 50, and the other side is connected to the lead 99 of the silicone-controlled rectifier, so that the light 106 is energized when the silicone-controlled rectifier 96 turns on. Similarly, the indicator lights 108, 110, 112, and 114 are associated with the respective channels 74, 76, 78, and 80 of the electronic circuit so that they light when the respective silicone-controlled rectifiers in the respective channels are turned on. The horn 100 is connected to the lead 98 of the silicone-controlled rectifier 96, and is similarly connected to the other silicone-controlled rectifiers so that it is energized when any of the channels are turned on.

Preferably the electronic circuitry is disposed in a housing below the panel 116. A three-position switch 118 is disposed on the panel 116 and is represented by a functional box in FIG. 3. The switch 118 includes a horn switch element 120, which is disposed in the powerline 102 to the horn, and a reset switch element 122, which is closable to ground out the power lead 50 and thereby disconnect the power from the electronic circuit entirely.

In operation, the separator or component drive clutch is generally disengaged when the combine is started, so that the switch 48 is open and the power supply is disconnected from the shaft-monitoring system. When the component drive clutch is engaged, the switch 48 is enclosed, the time delay circuit 52 is activated, and, as previously described, after a 15-second delay, 12 volts are provided in the power lead 50. The switch 118 is placed in its normal operating condition, wherein the horn switch 120 is closed and the reset switch 122 is open. The 15-second delay permits the various drive shafts 21, 23, 25, 28, and 34 to achieve their normal operating speed. The various drive shafts will, of course, have different operating speeds, and in the illustrated embodiment, the separator auger drive shaft 21 is driven at 335 r.p.m., the straw walker drive shaft 23 is driven at 160 r.p.m., the straw chopper drive shaft 25 is driven at 2,250 r.p.m., the clean grain elevator drive shaft 28 is driven at 375 r.p.m., and the tailings elevator drive shaft 34 is driven at 320 r.p.m. The values of the resistors 86 and the capacitors 82 in each of the channels of the electronic circuit are selected so that the respective indicator lights and the horn are actuated when the respective shafts rotate at some predetermined speed below their normal operating speed. In the preferred embodiment, the resistors and capacitors in the respective channels are selected so that the indicators are actuated when the respective shafts drop below 80 percent of their nominal speed. The permissible 20 percent variation allows for some tolerance in the system and also permits some speed variation due to variations in the engine speed. Of course, the 80 percent standard is arbitrarily set, and the system could be set to provide a greater or lesser tolerance of speed variation. Obviously, the tolerance in the various channels of the system could be varied, and a tighter tolerance could be established in any channel wherein the speed of the associated drive shaft is more critical. Also, variable resistors or capacitors could be provided to permit the operator to select the permitted degree of speed variation.

As previously described, each of the channels of the electronic circuit 70 functions in the same manner, and therefore only the operation of the channel 72, which controls the indicator for the separator conveyor drive shaft 21, will be described. As the shaft 21 rotates, the point 65 of the actuator 64 moves past the pulse pickup 66 once for each revolution of the shaft, thereby producing one electric pulse in the output lead 67 for each revolution of the shaft. Obviously, the actuator 64 could be provided with a greater number of points to produce more than one pulse for each revolution of the shaft.

Each electric pulse in the lead 67 passes through the one-way diode 84, which shorts the capacitor 82. The capacitor 82 and the resistor 86 form a conventional RC tuning circuit, and, as is conventional, it takes a certain interval of time to charge the RC tuning circuit to the 12-volt input voltage in the input lead 50, the amount of time depending on the values of the resistor 86 and the capacitor 82. The capacitor 82 is thus shorted or discharged for each revolution of the shaft. Since it takes a certain amount of time to fully charge the capacitor 82, if the rate of the pulse inputs is sufficiently rapid, the capacitor is continually shorted before the voltage across the capacitor builds up to the entire 12 volts. In the illustrated embodiment, when the shaft is operating above its critical speed, the capacitor 82 is shorted before the voltage across the capacitor reaches 8 volts. However, if the speed of the shaft 21 falls below its critical speed, the charge across the capacitor 82 exceeds 8 volts. The unit junction transistor 88 is selected so that it fires when the input voltage exceeds 8 volts. Since it is characteristic of such unit junction transistors that they require a substantially smaller voltage to stay on than to originally fire, once the input voltage exceeds 8 volts, the transistor 88 will stay on.

When the transistor 88 fires, it produces an electric pulse through the diode 92 which turns on the silicone-controlled rectifier 96, which, as is characteristic, stays on once it is turned on. When the silicone-controlled rectifier 96 turns on, it connects both the leads 98 and 99 to the ground lead, thereby completing the circuit for the indicator light 106 and the horn 100.

The panel 116 below the indicator light 106 can be appropriately labeled so that when the indicator light 106 is turned on, the operator is aware that the shaft 21 is rotating below its critical speed. The simultaneous actuation of the horn 100 provides an audible warning, which directs the attention of the operator to the panel 116, so that he is able to ascertain the particular drive which is malfunctioning. After the operator is aware of the malfunction, the horn can be turned off by flipping the switch 118 to a position which opens the switch 120, thereby breaking the horn circuit.

The dropoff in speed in the shaft 21 could be just a temporary condition, caused by a temporary overload, which causes a brief period of slippage in the drive, or alternately the speed could temporarily fall off due to a temporary decrease in engine speed. To determine if this is the case, the operator may move the switch 118 to its reset position, closing the switch 122 and shorting out the entire system. This, of course, drops the input voltages to the transistors 88 and 96 to zero, as well as interrupting the power supply to the indicator light. However, the time delay circuit 52 remains in the circuit, so that as soon as the switch 118 is shifted to again open the reset switch 122, the electric power is immediately supplied to the electronic circuit 70. If the shaft 21 is still rotating below speed, the light 106 again will turn on. The operator may retest the system as many times as he likes. If the operator decides to continue operating the combine, even though the speed of the shaft 21 is running below its critical speed, the switch lever 118 would normally be positioned so that the horn switch 120 is open. In such a case, if any of the other shafts 23, 25, 28, or 34 fall below their critical speed, the respective indicator lights would provide the only signal to the operator. However, it is normally contemplated that the operator will make the necessary repairs or adjustments when one of the shafts is constantly running below speed. Of course, the above description of operation applies to the other channels of the circuit and their respective indicator lights so that the operator is warned when any of the monitored shafts fall below their critical speeds.

As previously mentioned, the system can be adjusted to monitor other shaft speeds than those illustrated. For example, the combine could be equipped with a straw spreader rather than a straw chopper. Since the straw spreader normally rotates at a substantially lesser speed than a straw chopper, the channel 80 can be revised to monitor the lesser speed, or alternately, the pickup means 62 could be adjusted by providing a greater number of points on the actuator to increase the number of pulses for each revolution of the shaft.

We claim:

1. In an agricultural machine or combination of machines having a power source, an operator's station, a plurality of driven components, and a plurality of drive shafts driven by the engine and respectively associated with the respective driven components to transmit driving power thereto, the combination therewith: a source of electric power; a first magnetic pickup means operatively associated with one of said drive shafts for generating at least one electric pulse for each revolution of the shaft and including an actuator element attached to and rotatable with the shafts and a stationary pulse pickup adjacent to and spaced from the actuator element; an indicator means responsive to electric power; and electronic circuit means operatively connected to the source of electric power, the indicator means, and the first magnetic pickup means for connecting the indicator means to the source of electric power when the rate of electric pulses generated by the first magnetic pickup means falls below a piedetermined level.

2. The invention defined in claim 1 and including a second magnetic pickup means operatively associated with a second of said drive shafts and the electronic circuit means is operative to connect the indicator means to the source of electric power when the rate of electric pulses generated by the second magnetic pickup means falls below a second predetermined level.

3. The invention defined in claim 2 wherein the indicator means includes first and second indicator lights disposed at the operator's station and respectively energized by the electronic circuit means when the rates of the pulses generated by the first and second magnetic pickup means fall below their respective predetermined levels.

4. The invention defined in claim 3 wherein the indicator means includes audible signal means actuatable in response to the rate of pulse generation by any of the magnetic pickup means falling below their predetermined level.

5. The invention defined in claim 4 wherein the electronic circuit means includes manually actuatable switch means disposed at the operator's station and selectively actuatable to disconnect the audible signal means from the power source.

6. The invention defined in claim 3 wherein the indicator means includes a third indicator light and also including a third magnetic pickup means operatively associated with a third of said drive shafts and the electronic circuit means is operative to energize the third indicator light when the rate of the electric pulses generated by the third magnetic pickup falls below a third predetermined level.

7. The invention defined in claim 3 wherein the machine includes a selectively actuatable clutch operatively associated with the drive shafts to selectively disconnect the drive shafts from the engine and including a second switch means associated with the clutch and actuatable in response to disengagement of the clutch to disconnect the source of electric power from the circuit means.

8. The invention defined in claim 7 and including time delay means operatively associated with the electronic circuit means to delay the supply of electric power to the electronic circuit means for a predetermined interval after closing of the second switch means.

9. In a combine having an engine, a source of electric power, an operator's station, a plurality of driven components including a main separator conveyor, a tailings conveyor, a plurality of strawwalkers a clean grain elevator, and straw-handling means, a plurality of rotatable drive shafts respectively drivingly connected to said components, and means connecting the engine to said drive shafts and including a clutch means disengageable to disconnect the power source from the drive shafts, the improvement comprising: at least two electric signal generating means respectively associated with at least two of said shafts and operative to generate separate electric signals proportional to the speed of the respective shafts; a separate indicator light at the operator's station for each signal generating means; electronic circuit means operatively connected to the electric power source, the indicator lights, and the electric signal generating means to energize the respective indicator lights in response to a predetermined signal from the signal-generating means; and switch means in the electronic circuit means operatively connected to the clutch means to open in response to disengagement of the clutch means to disconnect the electric power source from the electronic circuit means.